Nov. 30, 1965 W. B. FRITZ ETAL 3,221,176

DRIVE CIRCUIT

Filed Aug. 26, 1960 2 Sheets-Sheet 1

INVENTORS.
WILLIAM B. FRITZ
JAMES H. WHITLEY
BY
Curtis, Morris & Safford
ATTORNEYS

DRIVE CIRCUIT

Filed Aug. 26, 1960

2 Sheets-Sheet 2

INVENTORS.
WILLIAM B. FRITZ
JAMES H. WHITLEY
BY

Curtis, Morris & Safford
ATTORNEYS 3,221,176
Patented Nov. 30, 1965

3,221,176

DRIVE CIRCUIT

William B. Fritz, Linglestown, and James H. Whitley, Harrisburg, Pa., assignors to AMP Incorporated, Harrisburg, Pa.

Filed Aug. 26, 1960, Ser. No. 52,295
8 Claims. (Cl. 307—88)

Figure 1:
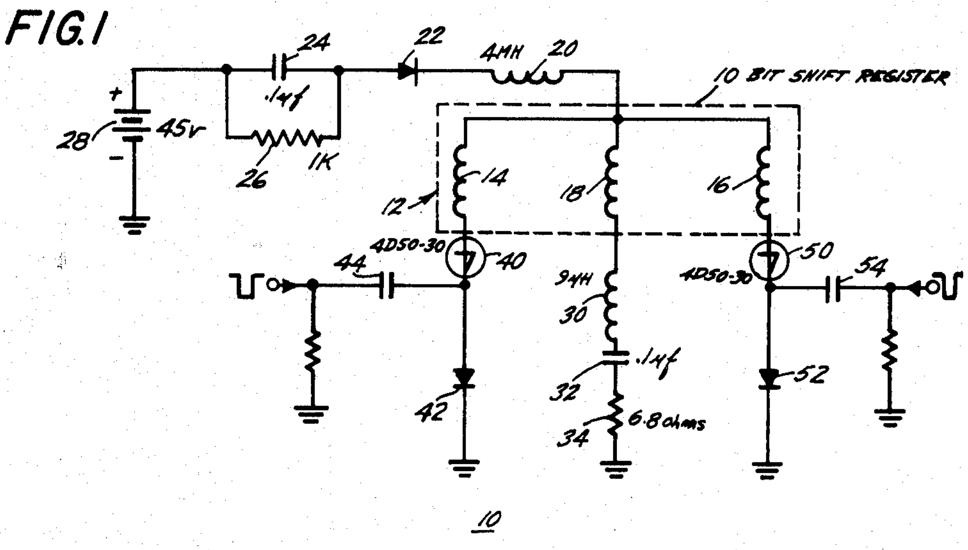

This invention relates to a drive circuit for a shift register and the like.

An object of the invention is to provide a highly efficient and reliable driver for energizing a magnetic core shift register and the like.

Another object is to provide a driver and shift register arrangement which insures optimum performance for the shift register and which effectively eliminates the possibility of mis-function.

A further object is to provide a drive circuit which is very small in size and which is simple and inexpensive to manufacture.

In co-pending application, U.S. Serial No. 9,282, now U.S. Patent 2,995,731 there is described a shift register using multi-aperture ferrite cores as memory elements. These cores are connected together by a unique and very advantageous wiring arrangement. This results in important savings in size and cost and gives great improvement in the electrical operation of the unit. A shift register of this kind includes three drive windings which must be energized in proper sequence by suitable currents to advance information from one core in the unit to the next, and so on. Two of these windings, termed advance windings, require pulses of current which are relatively large and of short duration. The third winding, termed a prime winding, on the other hand, needs a much smaller current with a longer duration. However, by judicious choice of the turns-ratio between the prime winding and the advance windings it is possible to make the number of coulombs (i.e. the product of current in amperes multiplied by the time duration of the current in seconds) required by each winding approximately equal. This feature is used to advantage, as will be explained.

Many previous circuits which have been available to supply energizing currents to this kind of shift register have been much larger than the register itself. Moreover, the more reliable of these circuits have been complicated and quite expensive. Thus, certain of the advantages of the shift register have been nullified. The present invention provides a drive circuit which is very small and inexpensive and which is extremely reliable in operation. Thus, the advantages of this shift register are obtained to the fullest extent.

In accordance with the present invention in one specific embodiment thereof, the energizing currents for all three of the drive windings of a shift register of the general kind mentioned above are supplied from a single capacitor. This capacitor is arranged to be charged from a direct voltage source, such as a battery and the charging current is used to energize the prime winding of the register. Thereafter, the capacitor is discharged, by means of a suitable switch such as a four-layer diode, through one of the advance windings to supply the short, high amplitude pulse of current required by it. The capacitor is again charged as before to provide the next prime current and is then discharged, by a second switch, into the other advance winding. Thereafter the above cycle of prime, first advance prime, and second advance currents is repeated, and so on, as required for operation of the register.

Because the same charge which energizes the prime winding is used, upon discharge of the capacitor, to energize an advance winding, the efficiency of this drive circuit is high. More importantly, it is impossible to generate an advance current pulse before the circuit has been primed. Thus, the danger of malfunctioning and of loss of information because of failure to "prime" is minimized.

Figure 2:
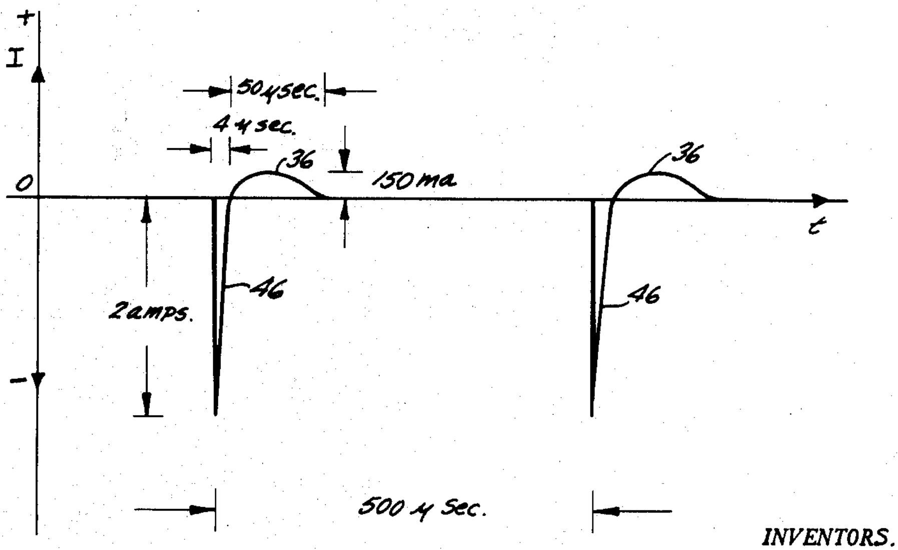
Figure 3:
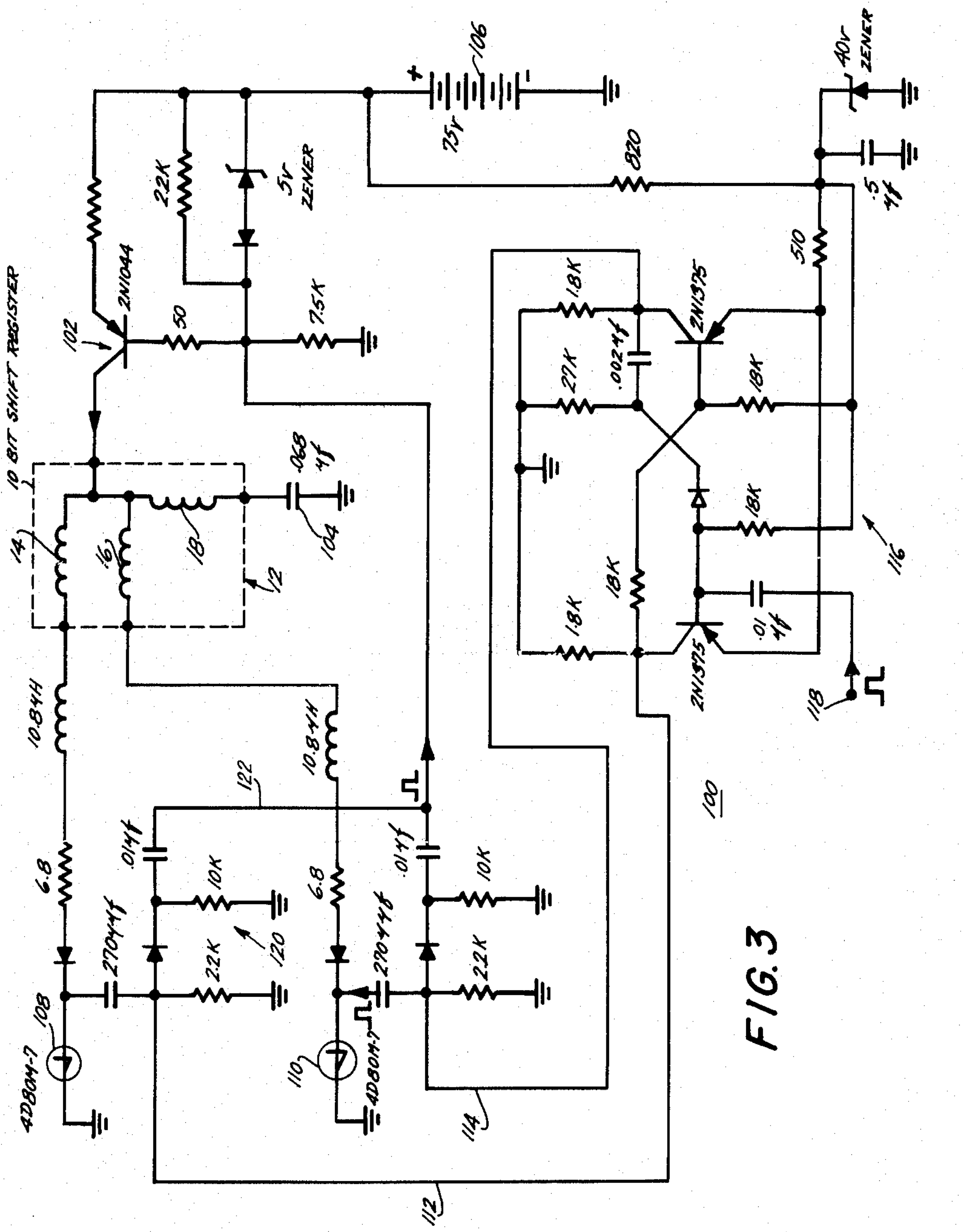

A better understanding of the invention together with a fuller appreciation of its many advantages will best be gained from the following description given in connection with the accompanying drawings wherein:

FIGURE 1 is a circuit diagram of a shift register-drive unit embodying features of the inventtion, FIGURE 2 is a diagram of current waveforms in the arrangement shown in FIGURE 1; and FIGURE 3 is a circuit diagram of another arrangement also embodying features of the invention.

The unit 10 shown in FIGURE 1 includes a shift register, generally indicated at 12, which has a first advance winding 14, a second advance winding 16, and a prime winding 18. This shift register can be identical to the one described in the aforesaid co-pending application. The three windings 14, 16 and 18 have one end connected in common to an external inductor 20 which forms part of a series resonant charging circuit. The other end of this inductor is connected to a rectifier 22 which prevents current flow in the opposite direction and thus de-couples this portion of the circuit when an advance current pulse is applied to the register. Connected to the left or anode side of rectifier 22 is a capacitor 24 which is shunted by a resistor 26, the other side of these elements being connected to a supply battery 28.

Pulses of direct current are able to flow from battery 28 through the elements named above into prime winding 18 and thence to ground through a second external inductor 30, a storage capacitor 32 and a damping resistor 34. These pulses as indicated by numerals 36 in FIGURE 2 have a relatively long duration and modest amplitude, and they serve to "prime" the register. Capacitors 24 and 32, inductors 20 and 30 together with winding 18, and resistor 32 comprise a slightly damped resonant charging circuit which behaves in known manner. By making capacitor 24 equal to capacitor 32, each will initially charge to nearly the full voltage of battery 28. Thereafter in a short time capacitor 24 will be discharged by resistor 26; capacitor 32 however, remains charged to the full battery voltage. If the latter capacitor had been charged to greater than the battery voltage, it could in time loose some of its charge and the subsequent advance current pulse supplied by this capacitor could possibly have too small an amplitude. In the present arrangement this is impossible.

After charging through prime winding 18 and priming the register, capacitor 32 is arranged to discharge through the prime winding and a selected one of the advance windings 14 and 16, inductor 30 making this a resonant discharge. To this end advance winding 14 is connected to ground through a four-layer diode 40 and a de-coupling diode 42. The former as is known, will not conduct in the forward direction unless the voltage across it exceeds a required value. Then the diode will conduct with low voltage drop until the current drops below a minimum value. The voltage breakdown of four layer diode 40 is chosen to exceed the voltage across capacitor 32. Thus, the capacitor cannot discharge through advance winding 14 until the four-layer diode is triggered. This is accomplished by applying to the anode of this diode through a capacitor 44 a negative voltage pulse, for example of ten or so volts of about a microsecond duration, which when added to the voltage on capacitor 32 causes diode 40 to break down and conduct. Diode 42 permits this voltage pulse to see only the relatively high impedance presented by the four-layer diode. Of course, unless capacitor 32 has previously been charged during the priming phase, diode 40 cannot turn on and there cannot be an advance pulse. This is an important feature of circuit 10.

When capacitor 32 discharges into an advance winding, the current which flows has a high amplitude, short duration waveform as indicated by numeral 46 in FIGURE 2. During the advance pulse the charging circuit comprising inductor 20 and the elements to the left of it offer a high impedance and are thus effectively out of the circuit. However, under steady-state conditions if four-layer diode 40 fails to extinguish upon discharge of capacitor 32, current could flow from battery 28 through inductor 20 and winding 14 into diode 42. Therefore, resistor 26 is made large enough so that even if this happens the maximum current which flows from battery 28 is too small to burn out any circuit components including the four-layer diode. Capacitor 24 bypasses resistor 26 so that in charging capacitor 32 during a priming phase, the current amplitude will be large enough for priming.

After capacitor 32 discharges through advance winding 14, four-layer diode 40 will extinguish. Thereafter current from battery 28 will build up through inductor 20 and flow through prime winding 18 to re-charge capacitor 32. When this capacitor has been charged and capacitor 24 discharged, the circuit is ready for a subsequent advance phase. The next advance pulse is passed through prime winding 18 and through the second advance winding 16. The latter is connected to ground through a four-layer diode 50 and a decoupling diode 52 which are identical, respectively with diodes 40 and 42. Four-layer diode 50 is triggered by a negative pulse applied through a capacitor 54 in the same way as diode 40.

FIGURE 3 shows a circuit arrangement 100, which is another embodiment of the invention wherein shift register 12 is energized by an automatically sequencing drive unit. This unit includes a transistor 102 connected as an emitter follower and arranged to supply a constant charging current to the register through its prime winding 18 to an external storage capacitor 104. Transistor 102 is energized by a battery 106. Capacitor 104 is discharged alternately through first advance winding 14 and second advance winding 16 by the action of four-layer diodes 108 and 110, respectively. These diodes are alternately triggered on at the appropriate times by positive pulses fed via leads 112 and 114 from a one-shot multi-vibrator generally indicated at 116. Since the operation of this element is well known it will not be described further.

Multi-vibrator 116 is actuated by a positive input pulse at terminal 118 and in response applies a positive pulse to lead 112. This turns four-layer diode 108 on and initiates an advance pulse through windings 18 and 14. This advance pulse is similar to an advance pulse 46 in FIGURE 2. The trigger pulse on lead 112 is also applied through a de-coupling network 120 to a lead 122 which turns charging transistor 102 off while capacitor 104 is discharging. Thereafter, this transistor turns on and re-charges capacitor 104, thereby again priming the shift-register.

After a suitable delay, multi-vibrator 116 automatically applies a positive pulse to lead 114 and turns diode 110 on and transistor 102 off as before. This full sequence of events is repeated when at the proper time another trigger pulse is applied to terminal 118.

Suitable values of elements for the circuits in FIGURES 1 and 3 have been indicated directly on the drawing. The invention, however, is not restricted to these values. To use a register wherein the advance windings and the prime winding are not in series during "advance," two additional diodes can be connected in the circuit of FIGURE 1. The first diode would be inserted between winding 18 and inductor 30 and poled for downward current flow. The second would be connected between the upper end of inductor 30 and the junction of windings 16 and 18 and poled for upward current flow. Of course, the size of inductor 30 and resistor 34 will have to be re-adjusted to give proper resonant discharge of capacitor 32. The above description is intended in illustration and not in limitation of the invention. Various changes or modifications may occur to those skilled in the art and can be made without departing from the spirit or scope of the invention as set forth.

We claim:

1. A magnetic core binary information handling circuit comprising a first magnetic core winding adapted to be energized with a relatively long, low amplitude drive current, a second magnetic core winding adapted to be energized with a relatively short, high amplitude drive current, and drive current means including a capacitor and inductor means for charging said capacitor at a desired rate through one of said windings and discharging said capacitor through the other of said windings, the size of said capacitor and the turns ratio of said windings being pre-determined in accordance with the desired amplitude of pulses into them, said capacitor and inductor means and said one winding forming a linear resonant charging circuit, said capacitor and inductor means and said other winding forming a linear resonant discharging circuit.

2. A driver arrangement for a magnetic core memory device having at least two windings to be energized by electric currents in sequence, said arrangement including an input to be supplied with direct current from a supply voltage, a linear inductor in series with said input and a first of said windings, a capacitor in series with said first winding and said inductor in a resonant charging path, switch means connecting a second of said windings in series with said first winding and said capacitor in a resonant discharging path, and signal input means to energize said switch means to pulse said second winding.

3. The arrangement in claim 2 wherein there is a second capacitor of the same size as the first and in series therewith, said second capacitor being shunted by a resistor, whereby said first capacitor charges only to said supply voltage on each cycle.

4. The arrangement in claim 2 wherein there is a second linear inductor in series with said capacitor and said first winding and also in series with said first and second windings and said switch means.

5. A driver arrangement of the character described comprising, a first magnetic core winding adapted to be energized with a relatively long, low amplitude drive current, a second magnetic core winding adapted to be energized with a relatively short, high amplitude drive current, an input to be energized with direct voltage, charging means including a diode, a linear inductor and a capacitor connected in series in a resonant charging path with said first winding, and switch means connecting said first winding and said second winding in a resonant discharging path with said capacitor.

6. The arrangement in claim 5 wherein said charging means includes a second capacitor of the same size as the first, said second capacitor being shunted by a resistor, whereby said first capacitor charges to only the input voltage on each cycle.

7. The arrangement in claim 5 wherein said charging means includes a second linear inductor in series with said first winding and said first and second windings in reverse direction.

8. A magnetic core binary information handling circuit comprising a first magnetic core winding adapted to be energized with a relatively long, low amplitude drive current, a second magnetic core winding adapted to be energized with a relatively short, high amplitude drive current, and drive current means including a capacitor and conductor means for charging said capacitor at a desired rate through one of said windings and discharging said capacitor through the other of said windings, the size of said capacitor and the turns ratio of said windings being predetermined in accordance with the desired amplitude of pulses into them, said capacitor and conductor means including a capacitor and a transistor circuit to charge said capacitor at a constant rate, said capacitor and conductor means including a linear inductor and a switch to discharge said capacitor through said one winding in reverse direction and through said other winding.

References Cited by the Examiner

UNITED STATES PATENTS

| | | | |
|---|---|---|---|
| 2,694,149 | 11/1954 | Gross | 320—1 |
| 2,970,294 | 1/1961 | Gutterman | 340—174 |
| 3,024,406 | 3/1962 | Porterfield | 320—1 |
| 3,024,446 | 3/1962 | Kornfield | 340—174 |
| 3,033,971 | 5/1962 | Pfau | 320—1 |

OTHER REFERENCES

Pages 46 and 47, Aug. 1959—IBM Technical Disclosure Bulletin, vol. 2, No. 2, "Core Shift Register," Adams et al.

IRVING L. SRAGOW, *Primary Examiner.*

JOHN F. BURNS, *Examiner.*